(12) United States Patent
Hamasaki

(10) Patent No.: US 9,253,350 B2
(45) Date of Patent: Feb. 2, 2016

(54) IMAGE DISTRIBUTION SYSTEM, IMAGE PROCESSING APPARATUS, AND RECORDING MEDIUM STORING A CONTROL PROGRAM

(71) Applicant: Takanari Hamasaki, Kanagawa (JP)

(72) Inventor: Takanari Hamasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/592,050

(22) Filed: Jan. 8, 2015

(65) Prior Publication Data

US 2015/0201099 A1    Jul. 16, 2015

(30) Foreign Application Priority Data

Jan. 15, 2014   (JP) ................. 2014-005388

(51) Int. Cl.
*H04N 1/00*   (2006.01)
(52) U.S. Cl.
CPC ....... *H04N 1/00811* (2013.01); *H04N 1/00087* (2013.01); *H04N 1/00129* (2013.01); *H04N 1/00411* (2013.01); *H04N 1/00824* (2013.01); *H04N 2201/0094* (2013.01)
(58) Field of Classification Search
USPC ........................................................ 358/1.15
See application file for complete search history.

(56) References Cited

U.S. PATENT DOCUMENTS

| | | | | |
|---|---|---|---|---|
| 2012/0322461 | A1* | 12/2012 | Ito ................. | G06F 21/35 455/456.1 |
| 2013/0070297 | A1* | 3/2013 | Kato ............... | H04N 1/00217 358/1.15 |
| 2013/0201132 | A1* | 8/2013 | Kunioka ........... | G06F 3/041 345/173 |

FOREIGN PATENT DOCUMENTS

| | | |
|---|---|---|
| JP | 2004-260800 | 9/2004 |
| JP | 2010-219700 | 9/2010 |

\* cited by examiner

*Primary Examiner* — Ngon Nguyen
(74) *Attorney, Agent, or Firm* — Harness, Dickey & Pierce, P.L.C.

(57) ABSTRACT

An image distribution system includes an image processing apparatus that scans a document into a scanned image and a wearable device that receives the scanned image distributed by the image processing apparatus. The image processing apparatus includes a device capability information acquisition unit that acquires device capability information that includes display capability information indicating image display capability of the wearable device and a configuration screen controller that controls whether or not a setting is selectable on a configuration screen displayed on a display unit of the image processing apparatus, the setting being used to generate configuration information used for scanning the document.

11 Claims, 10 Drawing Sheets

| DISPLAY TYPE | MONOCHROME DISPLAY |
|---|---|
| SUPPORTED IMAGE FORMATS | JPEG/PDF |
| FEASIBLE OPERATIONS | DISPLAY/SAVE |

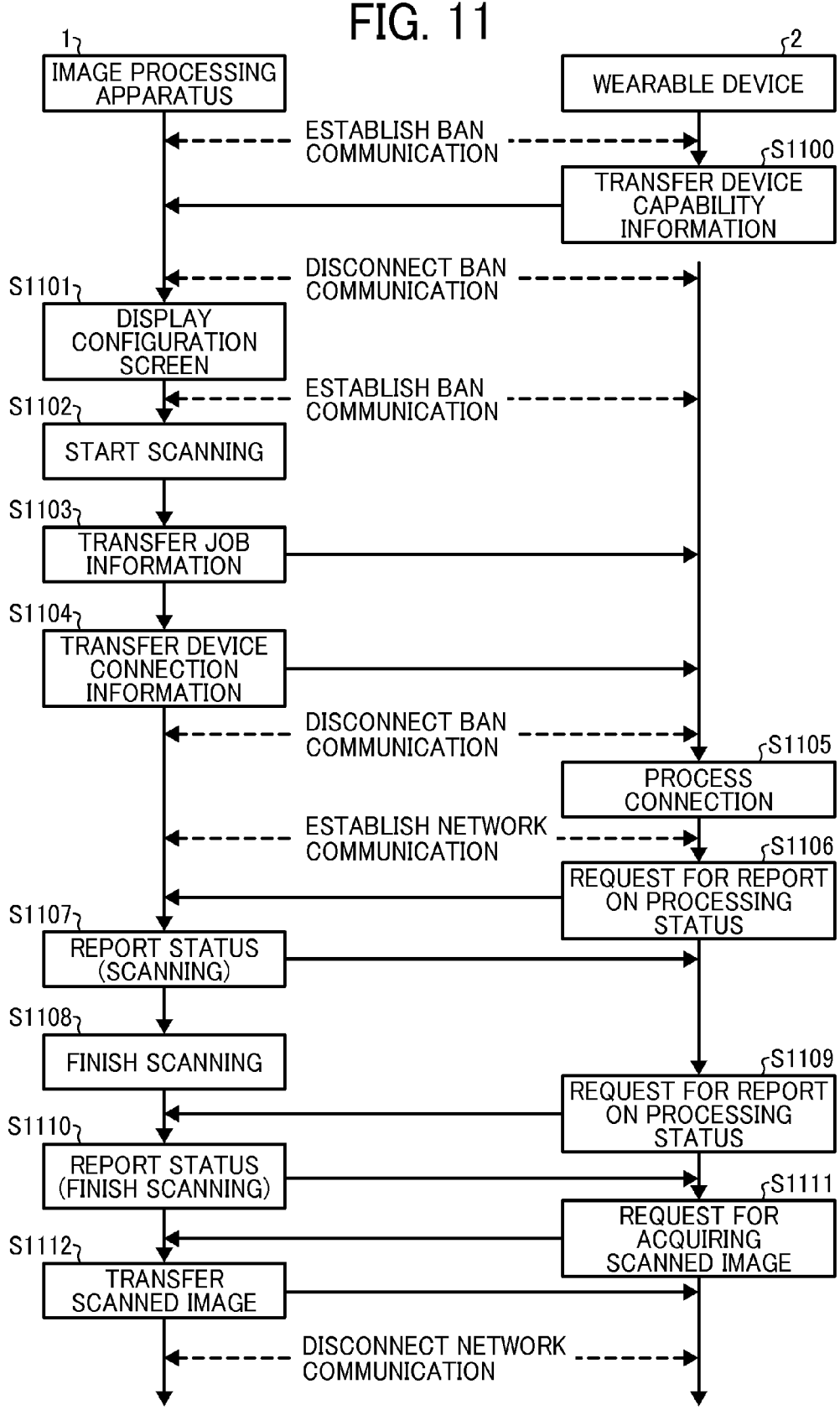

| VENDOR ID | PRODUCT ID | DISPLAY TYPE | SUPPORTED IMAGE FORMATS | FEASIBLE OPERATIONS |
|---|---|---|---|---|
| 0x0101 | 0x0001 | MONOCHROME | JPEG | DISPLAY |
| 0x0101 | 0x0002 | MONOCHROME | JPEG/PDF | DISPLAY/SAVE |
| 0xFFFE | 0x1001 | COLOR | JPEG/PDF | DISPLAY/SAVE |
| | | ...... | | |

IMAGE DISTRIBUTION SYSTEM, IMAGE PROCESSING APPARATUS, AND RECORDING MEDIUM STORING A CONTROL PROGRAM

CROSS-REFERENCE TO RELATED APPLICATION

This patent application is based on and claims priority pursuant to 35 U.S.C. §119 to Japanese Patent Application No. 2014-005388, filed on Jan. 15, 2014 in the Japan Patent Office, the entire disclosure of which is hereby incorporated by reference herein.

BACKGROUND

1. Technical Field

The present invention relates to an image distribution system, an image processing apparatus, and recording medium storing a control program.

2. Background Art

With increased computerization of information, image processing apparatuses such as printers and facsimiles used for outputting the computerized information and scanners used for computerizing documents have become indispensable. In most cases, these image processing apparatuses are configured as multifunction peripherals (MFPs) that can be used as a printer, facsimile, scanner, and copier by implementing an image pickup capability, image forming capability, and communication capability, etc.

On the other hand, information processing devices have also become highly functionalized, and information processing apparatuses that people can wear (hereinafter referred to as "wearable devices") and have information processing capabilities approaching the sophistication of personal computers (PCs) have become popular. These wearable devices have shapes that people can wear such as a wristwatch and a head-mount type, etc. Many wearable devices include user interfaces such as a touch panel, GPS, velocity sensor, and wireless communications capability, and can be used for various purposes depending on the software.

It is possible to process images on the image processing apparatuses in cooperation with the wearable devices. Specifically, for example, it is possible to perform scanning on the image processing apparatus, to transfer the scanned image to the wearable device, and display the scanned image on the display unit of the wearable device.

To facilitate image data transfer, a technology in which a communication apparatus that stores image data acquires the email address of the wearable device, etc., via body area network (BAN) communication, and sends email to the acquired email address with the image data attached has been proposed.

SUMMARY

An example embodiment of the present invention provides a novel image distribution system that includes an image processing apparatus that scans a document into a scanned image and a wearable device that receives the scanned image distributed by the image processing apparatus. The image processing apparatus includes a device capability information acquisition unit that acquires device capability information that includes display capability information indicating image display capability of the wearable device and a configuration screen controller that controls whether or not a setting is selectable on a configuration screen displayed on a display unit of the image processing apparatus, the setting being used to generate configuration information used for scanning the document.

Further example embodiments of the present invention provide a non-transitory recording medium storing a control program for the image distribution system.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 11 is a sequence diagram illustrating operation of wearable scanning in the system as an embodiment of the present invention.

DETAILED DESCRIPTION

Figure 1:
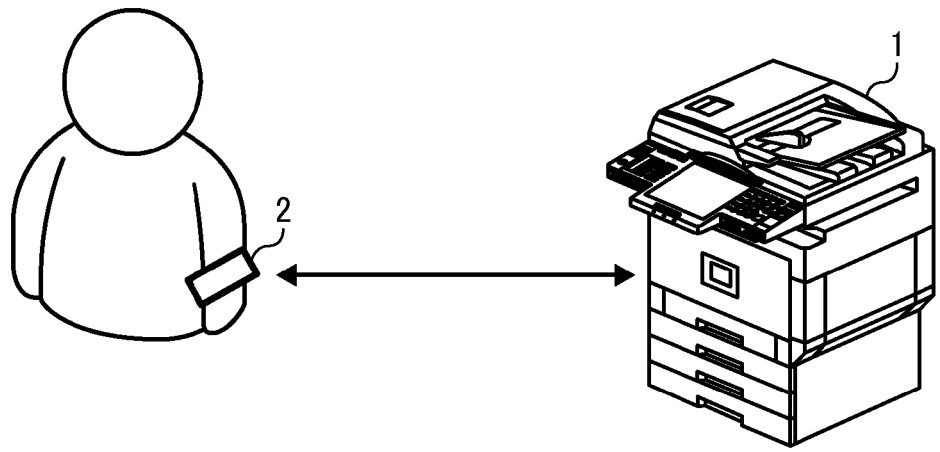
FIG. 1 is a diagram illustrating a system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

If the wearable device requests the cooperating image processing apparatus to send a scanned image, it is general that the wearable device configures setting information used for scanning and transfers the setting information to the image processing apparatus. However, operability of the wearable device is not good since its display is small and its user interface (UI) is poor compared to PCs and mobile devices such as smartphones. Therefore, it is difficult to configure the setting information on a configuration screen displayed on the display panel of the wearable device.

To cope with this issue, it is considered to configure the setting information on the configuration screen displayed on the display panel of the image processing apparatus that is larger than the display panel of the wearable device and has a rich UI. In that case, it is needed to configure the setting information for displaying the scanned image on the display panel of the wearable device appropriately. However, to perform the configuration described above, it is needed to select settings appropriately in accordance with specification of the wearable device etc., and it is difficult for a user with little knowledge of the specification of the wearable device etc. to configure the setting information.

In addition, in the conventional technologies, it is not considered to configure the setting information for displaying the scanned image on the display panel of the wearable device.

In the following embodiment, a system in which the image processing apparatus cooperates with the wearable device that people can wear and bring along such as a wristwatch type and a head-mounted display type is taken as an example.

FIG. 1 is a diagram illustrating a system as an embodiment of the present invention. As shown in FIG. 1, in an image processing system in this embodiment, an image processing apparatus 1 and a wearable device 2 that a user can wear are communicably connected with each other.

The image processing apparatus 1 is a MFP that implements an image pickup capability, image forming capability, and communication capability and can be used as a printer, facsimile, scanner, and copier.

The wearable device 2 is an information processing device that people can wear such as a wristwatch type and a head-mounted type etc. In this embodiment, the wearable device 2 is an information processing device controlled independently from the main unit of the image processing apparatus 1 and functions as a device that cooperates with the image processing apparatus 1 by installing application programs provided by a manufacturer of the image processing apparatus and a third party. In the description below, a wristwatch-type information processing device that the user can wear on his/her wrist is taken an example of the wearable device 2.

Figure 2:
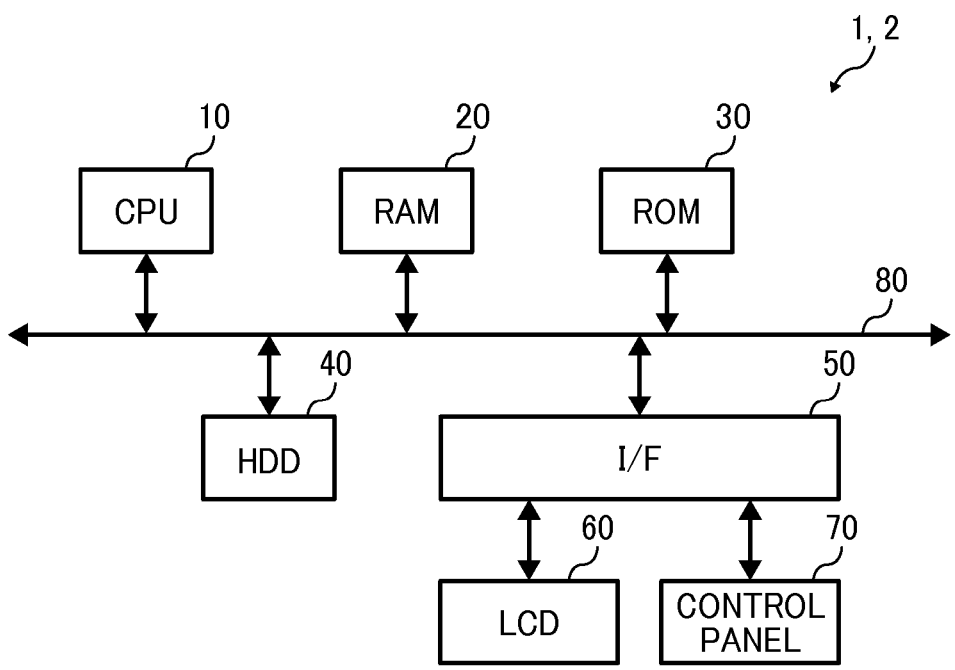
FIG. 2 is a block diagram illustrating a hardware configuration of an information processing apparatus as an embodiment of the present invention.

Next, hardware consisting of information processing apparatuses, i.e., the image processing apparatus 1 and the wearable device 2 included in the image processing system of this embodiment is described below. FIG. 2 is a block diagram illustrating a hardware configuration of the information processing apparatus in this embodiment. As shown in FIG. 2, the information processing apparatus in this embodiment includes the same configuration as a general server or PC etc.

That is, in the information processing apparatus in this embodiment, a Central Processing Unit (CPU) 10, a Random Access Memory (RAM) 20, a Read Only Memory (ROM) 30, a hard disk drive (HDD) 40, and an interface (I/F) 50 are connected with each other via a bus 80. In addition, a Liquid Crystal Display (LCD) 60 and an operational unit 70 are connected to the I/F 50. The image processing apparatus 1 includes an engine that executes forming an image, outputting the image, and scanning.

The CPU 10 is a processor and controls the whole operation of the information processing apparatus. The RAM 20 is a volatile storage device that can read/write information at high speed and is used as a work area when the CPU 10 processes information. The ROM 30 is a read-only non-volatile storage medium and stores programs such as firmware. The HDD 40 is a non-volatile storage medium that can read/write information and stores the OS, various control programs, and application programs etc. In addition to the HDD, semiconductor memory devices such as a Solid State Drive (SSD) can be used.

The I/F 50 connects the bus 80 with various hardware and networks, etc., and controls them. The LCD 60 is a visual user interface to check status of the information processing apparatus. The operational unit 70 is a user interface such as a keyboard, mouse, various hardware buttons, and touch panel to input information to the information processing apparatus.

In this hardware configuration described above, programs stored in storage devices such as the ROM 30, HDD 40, and optical discs (not shown in figures) are read to the RAM 20, and a software controlling unit is constructed by executing operation in accordance with the programs by the CPU 10. Functional blocks that implement functions of apparatuses that consist of the image processing system of this embodiment are constructed by a combination of the software controlling units described above and hardware.

Figure 3:
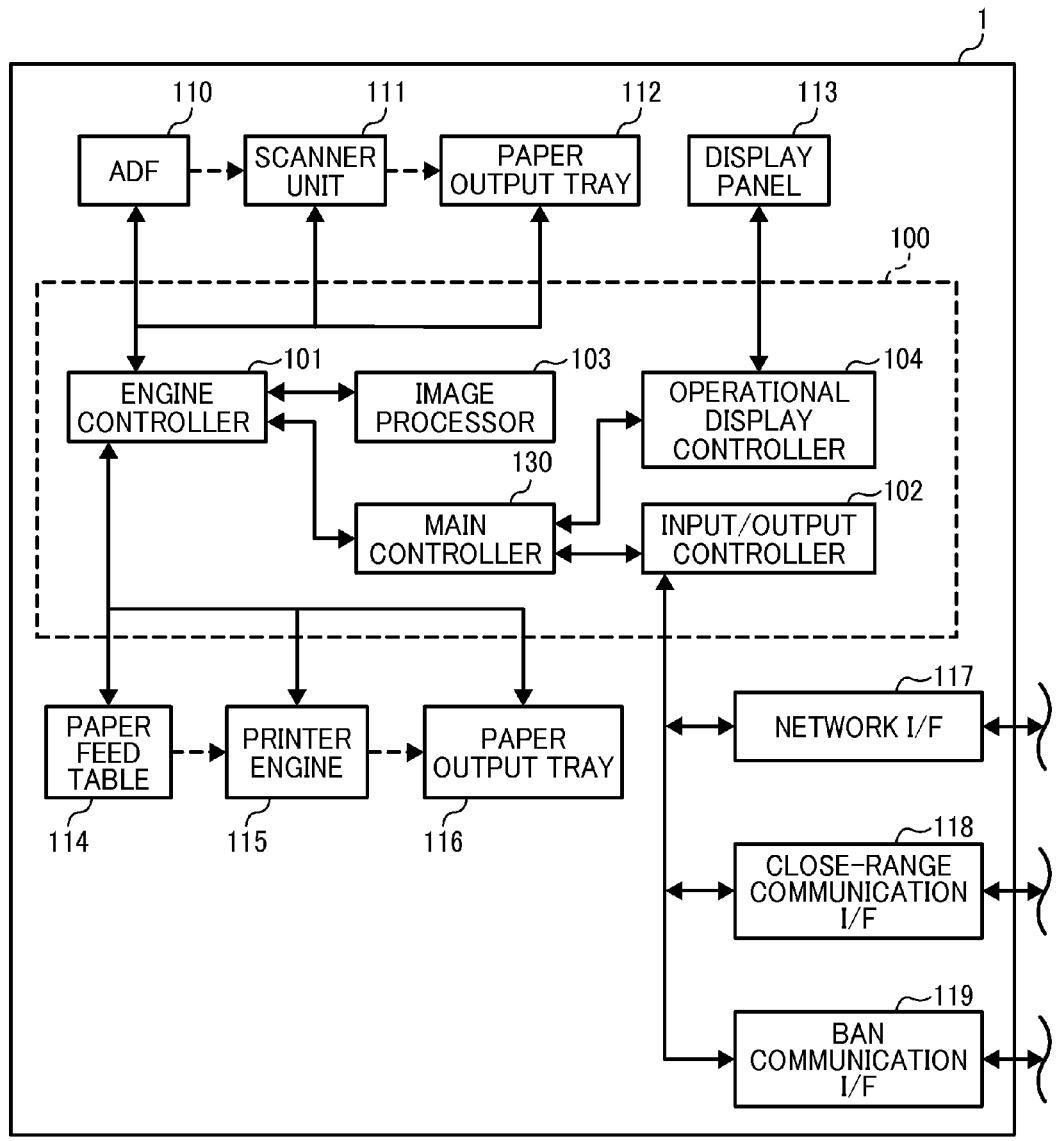
FIG. 3 is a block diagram illustrating a functional configuration of the image processing apparatus as an embodiment of the present invention.

Next, functions of the image processing apparatus 1 in this embodiment are described below. FIG. 3 is a block diagram illustrating a functional configuration of the image processing apparatus 1. As shown in FIG. 3, the image processing apparatus 1 includes a controller 100, an Auto Document Feeder (ADF) 110, a scanner unit 111, a paper output tray 112, a display panel 113, a paper feeding table 114, a print engine 115, a paper ejection tray 116, a network I/F 117, a close-range communication I/F 118, and a body area network (BAN) communication I/F 119.

The controller 100 includes a main controller 130, an engine controller 101, an input/output controller 102, an image processor 103, and an operational display controller 104. As shown in FIG. 3, the image processing apparatus 1 in this embodiment is constructed as the MFP that includes the scanner unit 111 and the print engine 115. In FIG. 3, solid arrows indicate electrical connections, and dashed arrows indicate flow of paper.

The display panel 113 is both an output interface that displays status of the image processing apparatus 1 visually and an input interface (operational unit) to operate the image processing apparatus 1 directly or input information to the image processing apparatus 1.

The network I/F 117 is an interface that the image processing apparatus 1 communicates with other apparatuses such as a device for an administrator etc. via a network, and Ethernet and USB interface are used for the network I/F 117. The close-range communication I/F 118 is an interface that the image processing apparatus 1 communicates with other apparatuses by close-range wireless communication, and interfaces such as Wireless Fidelity (Wi-Fi) and FeliCa are used as the close-range communication I/F 118. The BAN communication I/F 119 is an interface that the image processing apparatus 1 communicates with other apparatuses by BAN communication that uses the body as a communication medium (examples of which are described later).

The controller 100 combines software and hardware. In particular, control programs such as firmware stored in non-volatile storage medium such as the ROM 30 and the HDD 40 are loaded into the RAM 20, and the software controlling unit is implemented by executing operations by the CPU 10 in accordance with the programs. The controller 100 is constructed of the software controlling unit and hardware such as integrated circuits. The controller 100 functions as a controller that controls the whole part of the image processing apparatus 1.

The main controller 130 controls each unit included in the controller 100 and commands each unit in the controller 100. The engine controller 101 controls and drives the print engine 115 and the scanner unit 111. The input/output controller 102 inputs signals and commands input via the network I/F 117, the close-range communication I/F 118, and the BAN communication I/F 119 to the main controller 130. In addition, the main controller 130 controls the input/output controller 102 and accesses other apparatuses via the network I/F 117, the close-range communication I/F 118, and the BAN communication I/F 119.

The image processor 103 generates drawing information based on image information to be printed and output under the control of the main controller 130. The drawing information is information that the print engine 115 as an image forming unit draws as an image to be formed in an image forming operation. The image processor 103 processes image pickup data input from the scanner unit 111 and generates image data. The generated image data is stored in the image processing apparatus 1 as a result of the scanner operation or transferred to another apparatus via the network I/F 117, the close-range communication I/F 118, and the BAN communication I/F 119. The operational display controller 104 displays information on the display panel 113 and reports information input via the display panel to the main controller 130.

If the image processing apparatus 1 functions as the printer, first, the input output controller 102 receives a print job via the network I/F 117. The input/output controller 102 transfers the received print job to the main controller 130. After receiving the print job, the main controller 130 generates the drawing information based on the document information and image information included in the print job by controlling the image processor 103. After the image processor 103 generates the drawing information, the engine controller 101 executes forming an image on paper carried from the paper feeding table 114 based on the generated drawing information. As particular examples of the print engine 115, image forming mechanisms such as inkjet method and electrophotography method can be used. After the print engine 115 forms the image on the paper, the paper is ejected on the paper ejection tray 116.

If the image processing apparatus 1 functions as a scanner, in response to a command to execute scanning input by operation on the display panel 140 or from an external apparatus via the network I/F 117, the operational display controller 104 or the input/output controller 102 transfers a signal to execute scanning to the main controller 130. The main controller 130 controls the engine controller 101 based on the received signal to execute scanning. The engine controller 101 drives the ADF 110 and carries a document to be scanned set on the ADF 110 to the scanner unit 111. In addition, the engine controller 101 drives the scanner unit 111 and scans the document carried from the ADF 110. If the document is not set on the ADF 110 and the document is set on the scanner unit 111 directly, the scanner unit 111 scans the set document under the control of the engine controller 101. That is, the scanner unit 111 functions as the image pickup unit.

In scanning operation, an image pickup device such as CCD included in the scanner unit 111 scans the document optically, and image pickup information is generated based on the optical information. The engine controller 101 transfers the image pickup information generated by the scanner unit 111 to the image processor 103. The image processor 103 generates the image information based on the image pickup information received from the engine controller 101 under the control of the main controller 130. The image information generated by the image processor 103 is stored in the storage device such as the HDD 40 attached to the image processing apparatus 1. The image information generated by the image processor 103 is either stored in the HDD 40 etc. as is or transferred to an external apparatus by the input/output controller 102 via the network I/F 117 or the close-range communication I/F 118 depending on the user command.

If the image processing apparatus 1 functions as a copier, the image processor 103 generates the drawing information based on either the image pickup information received from the scanner unit 111 by the engine controller 101 or the image information generated by the image processor 103. Similarly as the printer operation, the engine controller 101 drives the print engine 115 based on the drawing information.

Figure 4:
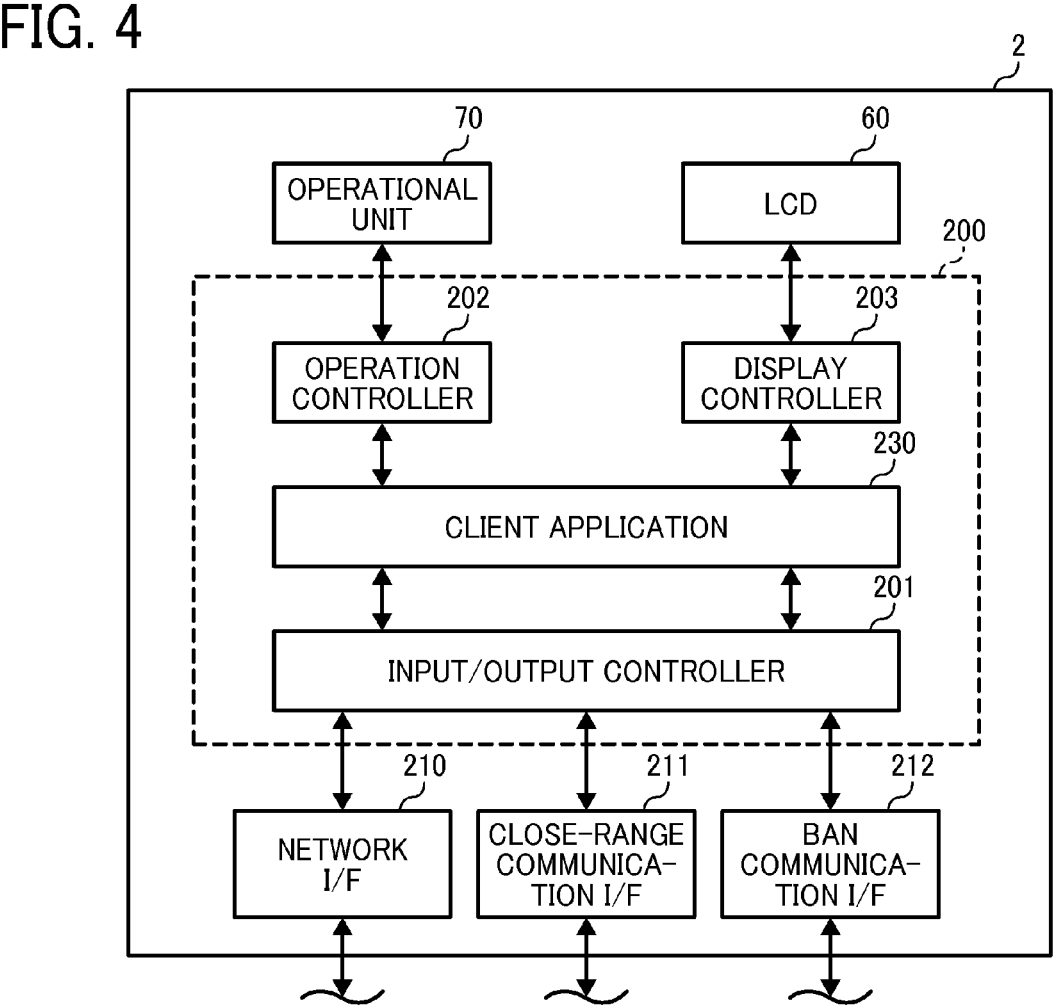
FIG. 4 is a block diagram illustrating a functional configuration of a wearable device as an embodiment of the present invention.

Next, a functional configuration of the wearable device 2 in this embodiment is described below with reference to FIG. 4. As shown in FIG. 4, in addition to the LCD 60 and the control panel 70 shown in FIG. 2, the wearable device 2 in this embodiment includes a controller 200, a network I/F 210, a close-range communication I/F 211, and an BAN communication I/F 212. The controller 200 includes an input/output controller 201, an operational controller 202, a display controller 203, and a client application 230.

The network I/F 210 is an interface that the wearable device 2 communicates with other apparatuses a network, and Ethernet and USB interface are used for the network I/F 210. The close-range communication I/F 211 is an interface that the wearable device 2 communicates with other apparatuses by close-range wireless communication, and interfaces such as Bluetooth, Wi-Fi and FeliCa are used as the close-range communication I/F 211.

The BAN communication I/F 212 is an interface by which the wearable device 2 communicates with other apparatuses by BAN communication that uses the body as a communication medium (examples of such communication are described below). The network I/F 210, the close-range communication I/F 211, and the BAN communication I/F 212 are implemented by the I/F 50 in FIG. 2.

The controller 200 combines software and hardware. The controller 200 functions as a controller that controls the whole part of the wearable device 2. The input/output controller 201 acquires information input via the network I/F 210, the close-range communication I/F 211, and the BAN communication I/F 212 and transfers information to other apparatuses via the network I/F 210, the close-range communication I/F 211, and the BAN communication I/F 212.

The operation controller 202 acquires a signal of user operation on the operational unit 70 and input the signal to a module that operates on the wearable device 2 such as the client application 230. The display controller 203 displays status of the wearable device 2 such as graphical user interface (GUI) of the client application 230 on the LCD 60 as a display unit of the wearable device 2.

The client application 230 is constructed of software programs installed and executed on the wearable device 2 to utilize functions of the image processing system in this embodiment on the wearable device 2. The client application 230 implements functions such as transferring the device capability information indicating functions (specifications) that the wearable device 2 includes, receiving a result that the image processing apparatus 1 processes based on generated configuration information based on the transferred device configuration information, and displays the result on the LCD 60 etc.

Figure 5:
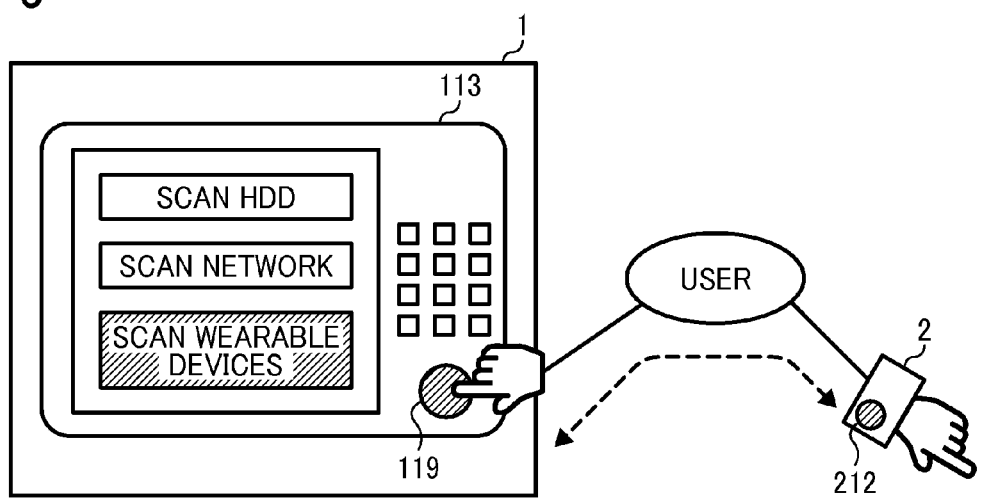
FIG. 5 is a diagram illustrating body area network communication as an embodiment of the present invention.

Next, BAN communication via the BAN communication I/F 119 on the image processing apparatus 1 and the BAN communication I/F 212 on the wearable device 2 in this embodiment is described below with reference to FIG. 5. FIG. 5 is a diagram illustrating BAN communication via the BAN communication I/F 119 on the image processing apparatus 1 and the BAN communication I/F 212 on the wearable device 2 in this embodiment.

As shown in FIG. 5, for example, a part of user body touches the BAN communication I/F 212 on the wearable device 2 by wearing the wristwatch type wearable device 2. Next, if the user who wears the wearable device 2 touches the BAN communication I/F 119 on the image processing apparatus 1, it is possible to perform data communication between the image processing apparatus 1 and the wearable device 2 using the user body as the communication media.

For example, as shown in FIG. 5, a start button on the display panel 113 of the image processing apparatus 1 functions as the BAN communication I/F 119. If the user who wears the wearable device 2 selects "wearable scan" that transfers a scanned image to the wearable device among scanning types such as "HDD scanning" and presses the start button or the user presses the start button to start scanning, the BAN communication is established between the image processing apparatus 1 and the wearable device 2. If the user released his/her finger from the start button, the BAN communication is disconnected. In the description above, the start button also functions as the BAN communication I/F 119 for example. However, it is possible to include the BAN communication I/F 119 apart from the start button. In this case, after pressing the start button, the user who wears the wearable device 2 touches the BAN communication I/F 119 separately.

In the system configuration described above, the image processing apparatus 1 in this embodiment generates a configuration screen displayed on the display unit of the image processing apparatus 1 based on the device capability information transferred from the wearable device 2, and the image processing apparatus 1 processes images based on the configuration information configured via the generated configuration screen. A scanning process as the image processing is described below as an example. In this case, the image processing system functions as an image distribution system that distributes (transfers) the scanned image generated by the image processing apparatus 1 to the wearable device 2.

Figure 6:
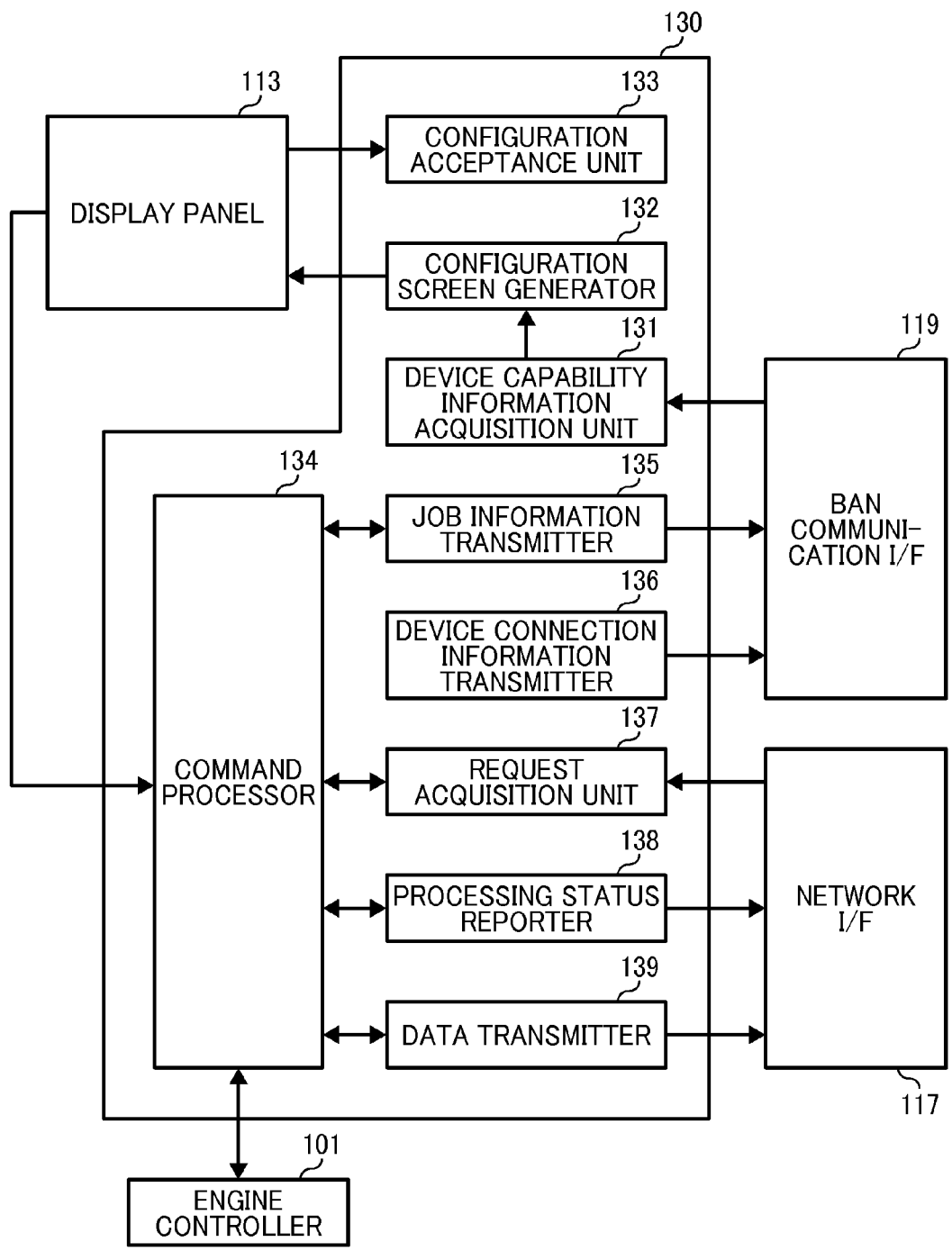
FIG. 6 is a block diagram illustrating a functional configuration of a main controller in the image processing apparatus as an embodiment of the present invention.

Next, a functional configuration of the main controller 130 in the image processing apparatus 1 in this embodiment related to the cooperating process with the wearable device 2 is described below with reference to FIG. 6. FIG. 6 is a block diagram illustrating a functional configuration of the main controller 130 related to the cooperating process with the wearable device 2 in this embodiment.

As shown in FIG. 6, the main controller 130 includes a device capability information acquisition unit 131, a configuration screen generator 132, a configuration acceptance unit 133, a command processor 134, a job information transmitter 135, a device connection information transmitter 136, a request acquisition unit 137, a processing status reporter 138, and a data transmitter 139. In FIG. 6, each of the configuration units of the main controller 130 is connected to the BAN communication I/F 119, the network I/F 117, and the display panel 113 directly. However, the data is input/output under the control of the input/output controller 102 and the operational display controller 104 actually. It is possible to input/output data via either the network I/F 117 or the close-range communication I/F 118.

As described above, if the user who wears the wearable device 2 selects "wearable scan" via the display panel 113 and presses the start button and the BAN communication is established, the device capability information acquisition unit 131 acquires the device capability information transferred from the wearable device 2 via the BAN communication I/F 119 and output the acquired device capability information to the configuration screen generator 132.

Figures 7, 8:
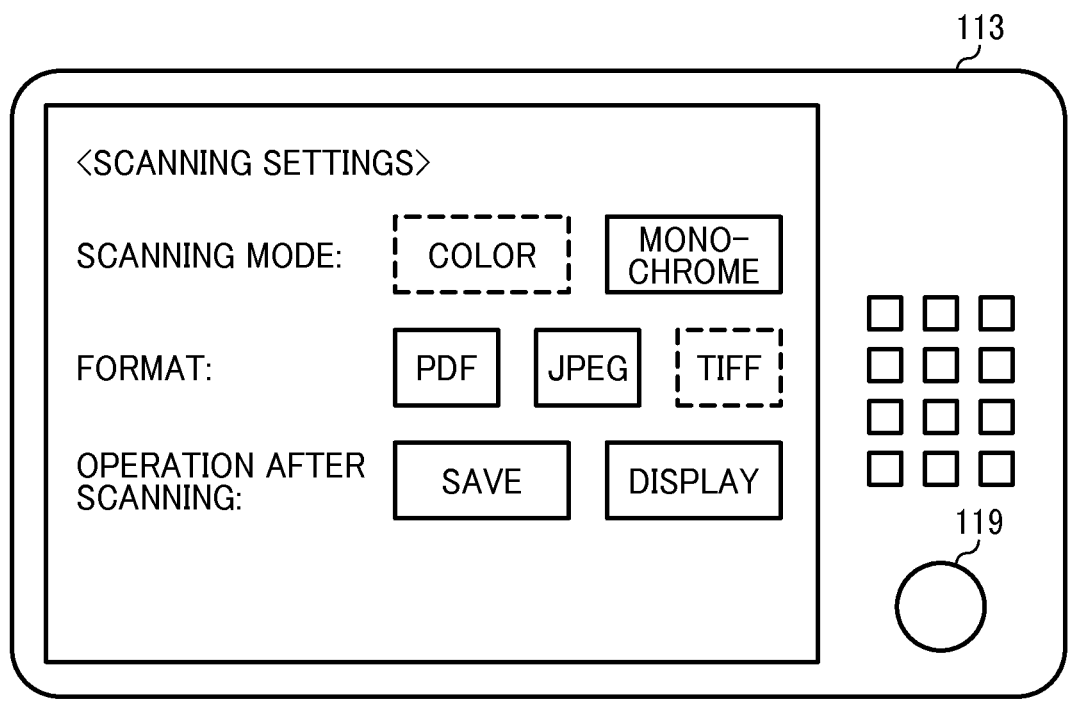
FIG. 7 is a diagram illustrating device capability information as an embodiment of the present invention.
FIG. 8 is a diagram illustrating a configuration screen displayed on a display panel of the image processing apparatus as an embodiment of the present invention.

FIG. 7 is a diagram illustrating an example of the device capability information that the device capability information acquisition unit 131 acquires. For example, the device capability information includes the display capability information and executable process information. The display capability information indicates the capabilities of the screen display of the wearable device 2 and includes the type of display included in the wearable device 2 and supported image formats that can be displayed on the LCD 60 of the wearable device 2. As shown in FIG. 7, the executable process information indicates executable operations performed on the scanned image transferred from the image processing apparatus 1.

For example, as shown in FIG. 7, in the device capability information, the display type is monochrome display, the supported image format is Joint Photographic Experts Group (JPEG) and Portable Document Format (PDF), and the executable operation is "display" and "save". In the "display" operation, the scanned image transferred from the image processing apparatus 1 is displayed on the LCD 60 of the wearable device 2. In the "save" operation, the scanned image is stored in a storage device in the wearable device 2 etc.

The configuration screen generator 132 generates the configuration screen displayed on the display panel 113 on the image processing apparatus 1 based on the device capability information input from the device capability information acquisition unit 131. On the configuration screen, the configuration information used for scanning by the image processing apparatus 1 is configured.

More specifically, for example, the configuration screen generator 132 generates a configuration screen that can select items corresponding to the display type, the supported image format, and the executable operation included in the acquired device capability information only. The configuration screen generator 132 displays the generated configuration screen on the display panel 113.

FIG. 8 is a diagram illustrating the configuration screen displayed on the display panel 113. The configuration screen in FIG. 8 is generated by the configuration screen generator 132 that the device capability information in FIG. 7 is input. Since the display type is monochrome display in the device capability information in FIG. 7, only "monochrome" mode that generates a scanned image in monochrome can be selected in the scanning mode on the configuration screen as shown in FIG. 8, and "color" mode that generates a scanned image in color cannot be selected (the item "color" is displayed using dotted lines in the configuration screen shown in FIG. 8).

Similarly, in the configuration screen format shown in FIG. 8, only "PDF" and "JPEG" can be selected as the format of the scanned image generated by the scanning process, and "Tagged Image File Format (TIFF)" cannot be selected. In the post-scanning process in the configuration screen shown in FIG. 8, both "save" and "display" can be selected as post-processes after transferring the scanned image that the image processing apparatus 1 processed to the wearable device 2.

As described above, the configuration screen generator 132 functions as a configuration screen controller that controls whether or not items can be selected on the configuration screen based on the acquired device capability information.

The configuration acceptance unit 133 accepts the configuration information configured by user operation via the configuration screen displayed on the display panel 113. For example, by selecting "JPEG" as the format and "display" as the post-scanning operation by user operation via the configuration screen shown in FIG. 8, the configuration acceptance unit 133 accepts the configuration information indicating "monochrome" as the scanning mode, "JPEG" as the format, and "display" as the post-scanning operation.

The command processor 134 processes commands in accordance with user operation on the display panel 113. For example, after configuring the configuration information by user operation via the configuration screen in FIG. 8 and pressing the start button, the command processor 134 controls the engine controller 101 and performs scanning based on the configuration information accepted by the configuration acceptance unit 133.

In addition, in performing the scanning process, the command processor 134 generates job information and outputs it to the job information transmitter 135. For example, the job information includes a job ID that identifies the scanning job and post-scanning operation information (such as "display") accepted by the configuration acceptance unit 133 as the process information indicating a process on the scanned image by the wearable device 2.

In addition, in accordance with a request input from the request acquisition unit 137 (described later), the command processor 134 outputs the status of the executing process (e.g., "in process" and "completed") to the processing status reporter 138 and outputs the processed data (e.g., the scanned image) to the data transmitter 139.

As described above, if the user who wears the wearable device 2 selects "wearable scan" via the display panel 113 and presses the start button and the BAN communication is established, the job information transmitter 135 outputs the job information input from the command processor 134 to the wearable device 2 via the BAN communication I/F 119.

The device connection information transmitter 136 transfers the job information input from the job information transmitter 135 and transfers the device connection information to the wearable device 2 via the BAN communication I/F 119. The device connection information is information used when the wearable device 2 communicates with the image processing apparatus 1 other than the BAN communication. The network I/Fs 117 and 210 and the close-range communication I/F 118 and 211 are examples used for the communication other than the BAN communication. The communication other than the BAN communication is referred to as "network communication" hereinafter.

For example, if the wearable device 2 is connected to the image processing apparatus 1 by ad-hoc mode of Wi-Fi, the device connection information includes Basic Service Set Identifier (BSSID), authentication type, encryption key (Wired Equivalent Privacy (WEP) key), Internet Protocol (IP) address of the image processing apparatus 1 and subnet mask etc.

After establishing network communication between the wearable device 2 and the image processing apparatus 1 based on the device connection information transferred from the device connection information transmitter 136, the request acquisition unit 137 acquires a request from the wearable device 2 via the network I/F 117 and outputs it to the command processor 134. Examples of the request from the wearable device 2 are a request for reporting status of the scanning process and a request for transferring the scanned image.

The processing status reporter 138 acquires the status of the scanning process input from the command processor 134 in accordance with the request for reporting status by the request acquisition unit 137 and reports it to the wearable device 2 via the network I/F 117. The data transmitter 139 acquires the scanned image input from the command processor 134 in accordance with the request for transferring scanned image by the request acquisition unit 137 and transfers it to the wearable device 2 via the network I/F 117.

Figure 9:
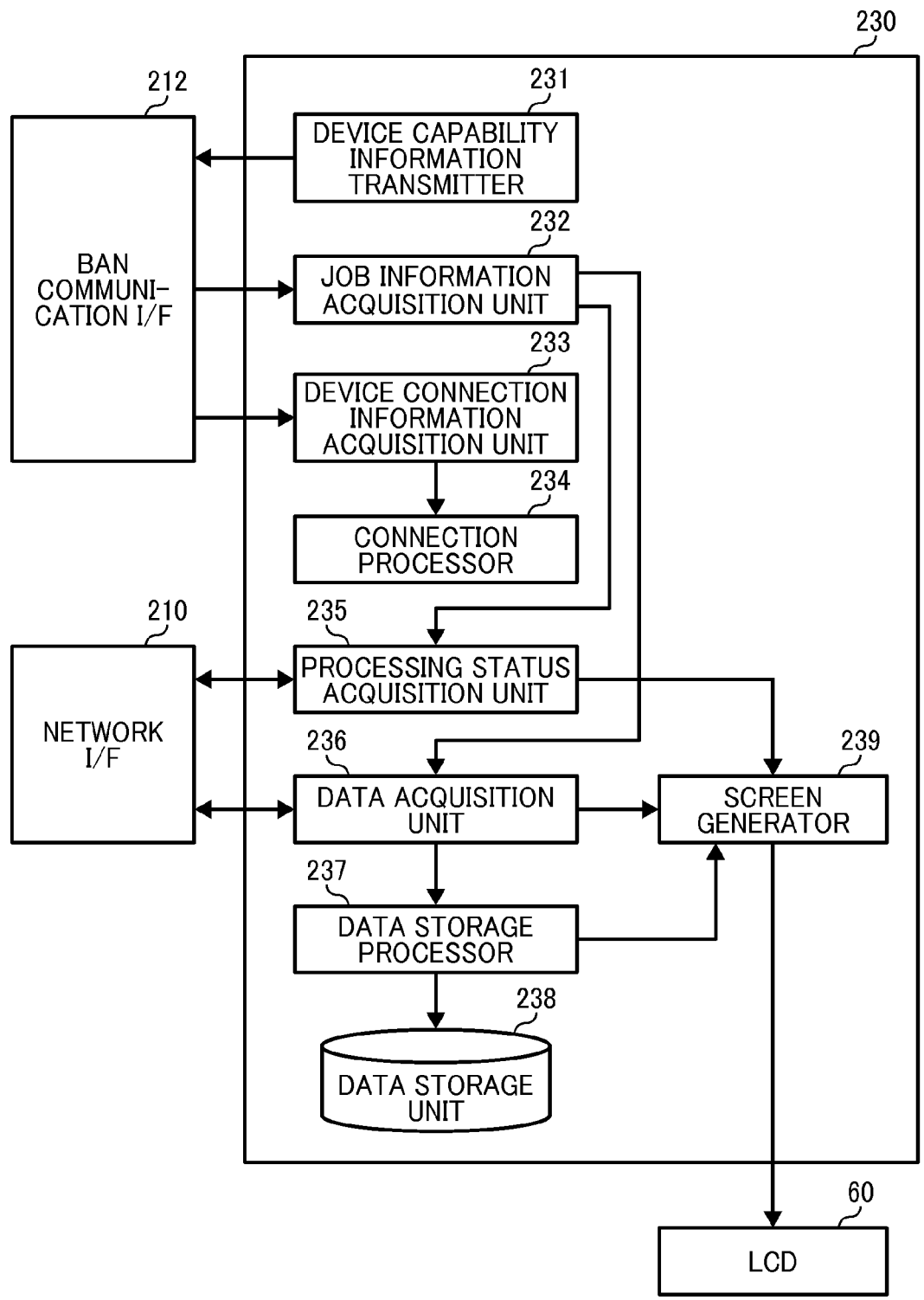
FIG. 9 is a block diagram illustrating a functional configuration of a client application in the wearable device as an embodiment of the present invention.

Next, a functional configuration of the client application 230 in the wearable device 2 in this embodiment is described below with reference to FIG. 9. FIG. 9 is a block diagram illustrating a functional configuration of the client application 230 in the wearable device 2 in this embodiment.

As shown in FIG. 9, the client application 230 includes a device capability information transmitter 231, a job information acquisition unit 232, a device connection information acquisition unit 233, a connection processor 234, a processing status acquisition unit 235, a data acquisition unit 236, a data storage processor 237, a data storage unit 238, and a screen generator 239. In FIG. 9, just like in FIG. 6, each of the configuration units of the client application 230 is connected to the BAN communication I/F 212, the network I/F 210, and the LCD 60 directly. However, the data is input/output under the control of the input/output controller 102 and the operational display controller 104 actually. It is possible to input/output data via either the network I/F 117 or the close-range communication I/F 118.

If the BAN communication with the image processing apparatus 1 is established, the device capability information transmitter 231 transfers the device capability information of the wearable device 2 shown in FIG. 7 to the device capability information acquisition unit 131 via the BAN communication I/F 212. The device capability information is stored in storage media such as the ROM 30 and the HDD 40 in the wearable device 2.

If the BAN communication with the image processing apparatus 1 is established, the job information acquisition unit 232 acquires the job information transferred from the job information transmitter 135 via the BAN communication I/F 212 and transfers it to the processing status acquisition unit 235 and the data acquisition unit 236 (described later). That is, the job information acquisition unit 232 functions as a processing information acquisition unit that acquires processing information as operational information after scanning included in the job information.

The device connection information acquisition unit 233 acquires the job information using the job information acquisition unit 232, acquires the device connection information transferred from the device connection information transmitter 136 via the BAN communication I/F 212, and outputs it to the connection processor 234. The connection processor 234 establishes network communication with the image processing apparatus 1 (e.g., ad-hoc mode of Wi-Fi) based on the device connection information input from the device connection information transmitter 136.

If the network communication with the image processing apparatus 1 is established, the processing status acquisition unit 235 outputs a request for reporting a processing status of a job whose job ID is included in the job information input from the job information acquisition unit 232 to the request acquisition unit 137 via the network I/F 210. In addition, the processing status acquisition unit 235 acquires the processing status reported from the processing status reporter 138 in accordance with the request for reporting the processing status and outputs it to the screen generator 239. In addition, if the acquired processing status indicates "process completed", the processing status acquisition unit 235 reports to the data acquisition unit 236 that the process ends.

In case of receiving the notification of the completion of the process from the process status acquisition unit 235, the data acquisition unit 236 outputs a request for transferring a scanned image as a result of a job whose job ID is included in the job information input from the job information acquisition unit 232 to the request acquisition unit 137 via the network I/F 210. The data acquisition unit 236 acquires the scanned image transferred from the data transmitter 139 in accordance with the request for transferring the scanned image. That is, the data acquisition unit 236 functions as a scanned image acquisition unit that acquires the scanned image.

If the operational information after scanning included in the job information input from the job information acquisition unit 232 indicates "display" (a displaying process), the data acquisition unit 236 outputs the acquired scanned image to the screen generator 239. If the operational information after scanning included in the job information input from the job information acquisition unit 232 indicates "save" (a saving process), the data acquisition unit 236 outputs the acquired scanned image to the data storage processor 237. If the operational information after scanning included in the job information input from the job information acquisition unit 232 indicates both "display" and "save", the data acquisition unit 236 outputs the acquired scanned image to both the data storage processor 237 and the screen generator 239.

The data storage processor 237 instructs the data storage unit 238 to store the scanned image input from the data acquisition unit 236. In addition, after instructing the data storage unit 238 to store the scanned image, the data storage processor 237 notifies the screen generator 239 that the storing process has ended. The data storage unit 238 is a storage medium that stores the scanned image that the data acquisition unit 236 acquires.

The screen generator 239 generates a screen in accordance with the information input from the processing status acquisition unit 235 and the data acquisition unit 236 and displays the generated screen on the LCD 60. FIG. 10 is a diagram illustrating a screen displayed on the LCD 60 of the wrist-watch-type wearable device 2 in this embodiment. The screen in FIG. 10 is generated by the screen generator 239.

Figure 10A:
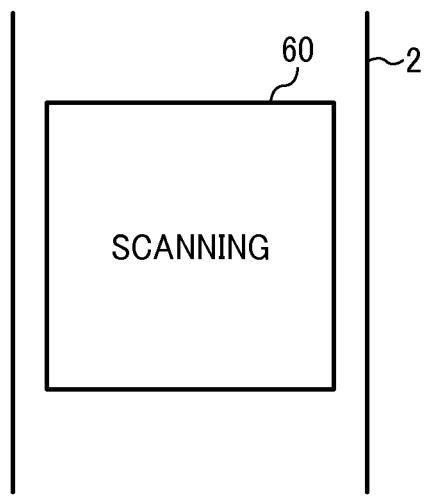
FIGS. 10A, 10B, 10C, and 10D are diagrams illustrating a screen displayed on a LCD of the wearable device as an embodiment of the present invention.

After the processing status is input from the processing status acquisition unit 235, the screen generator 239 generates a screen in accordance with the input information and displays the generated screen on the LCD 60. For example, if the processing status that the screen generator 239 acquires indicates "processing", a message "scanning" is displayed on the LCD 60 as shown in FIG. 10A. For example, if the processing status that the screen generator 239 acquires indicates "process completed", a message "complete scanning" is displayed on the LCD 60 as shown in FIG. 10B, and a message "receiving data" that indicates that the scanned image data is being acquired as well.

Figure 10B:
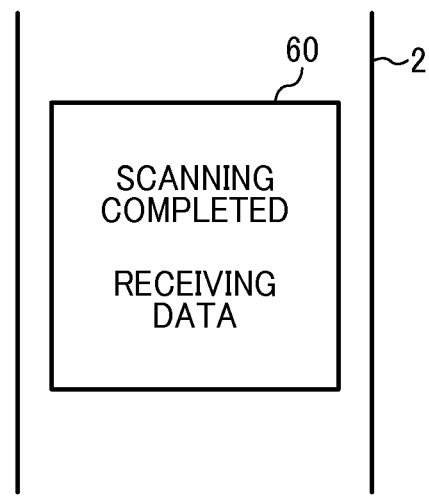
Figure 10C:
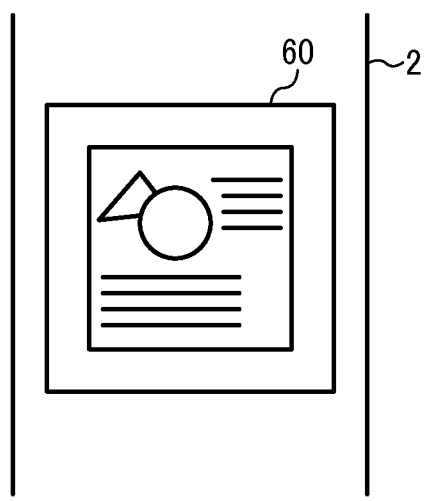

After the scanned image is input from the data acquisition unit 236, the screen generator 239 displays the input scanned image on the LCD 60 as shown in FIG. 10C. In addition, after the data storage processor 237 reports that the storing process ends, the screen generator 239 generates a screen that indicates that the storing process ends, and, e.g., displays a message "complete saving data" on the LCD 60 as shown in FIG. 10D.

Figure 10D:
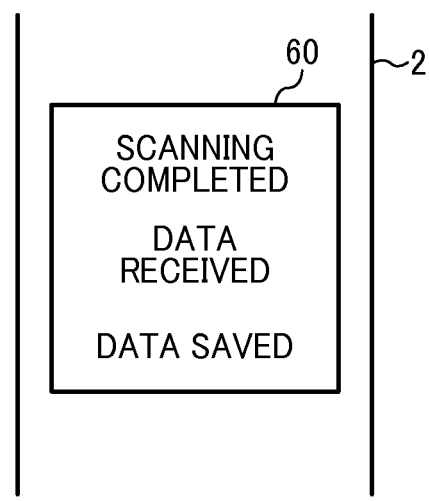

It should be noted that displaying the processing status on the LCD 60 as shown in FIGS. 10A, 10B, and 10D is not necessary. It is enough to display the scanned image on the LCD 60 if the operation after scanning is "display". If the operation after scanning indicates both "display" and "save", it is possible to prioritize displaying the scanned image on the LCD 60 and not to display the message "data saved". Otherwise, it is possible to display the message on the screen displaying the scanned image simultaneously.

That is, the data storage unit 237 and the screen generator 239 function as a scanned image processing unit that processes the scanned image that the data acquisition unit 236 acquires.

Next, an operation that wearable scanning that the image processing apparatus 1 and the wearable device 2 cooperates is performed in the image processing system of this embodiment is described below with reference to FIG. 11.

FIG. 11 is a sequence diagram illustrating the operation of the wearable scanning in the system in this embodiment. First, As described before with reference to FIG. 5, if the user who wears the wearable device 2 selects "wearable scan" via the display panel 113 and presses the start button, the BAN communication is established.

As shown in FIG. 11, if BAN communication is established, the wearable device 2 transfers the device capability information to the image processing apparatus 1 using BAN communication in S1100. If the user released his/her finger from the start button, BAN communication is disconnected. After acquiring the device capability information transferred from the wearable device 2, the image processing apparatus 1 displays the configuration screen for scanning shown in FIG. 8 on the display panel 113 based on the acquired device capability information in S1101.

In this case, if the user configures the configuration information on the configuration screen displayed on the display panel 113 and presses the start button to start scanning, BAN communication is established. The image processing apparatus 1 starts scanning based on the configuration information configured via the configuration screen displayed on the display panel 113 in S1102.

After starting scanning, the image processing apparatus 1 transfers job information of the started scanning job to the wearable device 2 using BAN communication in S1103. In addition, the image processing apparatus 1 transfers the device connection information to the wearable device 2 using the BAN communication in S1104. Next, if the user releases the start button, the BAN communication is disconnected.

After acquiring the device connection information from the image processing apparatus 1, the wearable device 2 establishes connection with the image processing apparatus 1 based on the acquired device connection information in S1105. As described above, BAN communication between the image processing apparatus 1 and the wearable device 2 is established.

After establishing the BAN communication between the image processing apparatus 1 and the wearable device 2, the wearable device 2 transfers a request for reporting the processing status to the image processing apparatus 1 using the network communication in S1106. After acquiring the request for reporting the processing status from the wearable device 2, the image processing apparatus 1 reports the processing status that indicates "processing" to the wearable device 2 using the network communication in S1107.

Next, the scanning process performed by the image processing apparatus 1 ends in S1108. After acquiring the processing status that indicates "processing" from the image processing apparatus 1, the wearable device 2 transfers the request for reporting the processing status to the image processing apparatus 1 using the network communication again after predetermined time elapses in S1109. After acquiring the request for reporting the processing status from the wearable device 2, the image processing apparatus 1 reports the processing status that indicates "processing completed" to the wearable device 2 using the network communication in S1110.

After acquiring the processing status that indicates "processing completed" from the image processing apparatus 1, the wearable device 2 transfers the request for transferring the scanned image to the image processing apparatus 1 using the network communication in S1111. After acquiring the request for transferring the scanned image from the wearable device 2, the image processing apparatus 1 transfers the requested scanned image to the wearable device 2 using the network communication in S1112. After finishing transferring the scanned image, the network communication is disconnected.

Next, the wearable device 2 displays the transferred scanned image on the LCD 60 as shown in FIG. 10C and stores the scanned image in the data storage unit 238 in accordance with the operational information after scanning.

As described above, in this embodiment, after acquiring the device capability information that includes the display capability information related to displaying images from the cooperating wearable device 2, the image processing apparatus 1 controls whether or not selecting items are selectable in the configuration screen displayed on the display panel 113 in the image processing apparatus 1 to generate the configuration information used for scanning. Consequently, the configuration screen is displayed on the display panel 113 in the image processing apparatus 1 that is larger than the wearable device 2 and has a rich UI, and that improves usability. In addition, since the configuration screen is controlled so that settings that cannot achieve intended displaying result using the display function of the wearable device 2, it is possible to configure the configuration information used for displaying the scanned image on the wearable device more easily than before.

In addition, in this embodiment, the device capability information of the wearable device 2 is transferred to the image processing apparatus 1 using the BAN communication between the image processing apparatus 1 and the wearable device 2. Consequently, since the communication between the image processing apparatus 1 and the wearable device 2 device is established only if the user who wears the wearable device 2 touches the BAN communication I/F 119 on the image processing apparatus 1 without performing the configuration for communicating with the image processing apparatus 1 on the wearable device 2, it is possible to acquire the device capability information used for generating the configuration screen by the image processing apparatus 1 more easily than before. However, the configuration described above is not essential, and other connecting configurations such as connecting the wearable device 2 to the image processing apparatus 1 using USB interface and performing communication can be adopted.

In addition, in this embodiment, the device connection information used for communicating with the image processing apparatus 1 not using the BAN communication is transferred to the wearable device 2 using the BAN communication between the image processing apparatus 1 and the wearable device 2, and the wearable device 2 establishes communication other than the BAN communication with the image processing apparatus 1 based on the transferred device connection information and receives the scanned image from the image processing apparatus 1. Consequently, since the device connection information can be acquired only if the user who wears the wearable device 2 touches the BAN communication I/F 119 on the image processing apparatus 1 without inputting the device connection information etc. for performing network communication with the image processing apparatus 1 on the wearable device 2, it is possible to establish the network communication between the image processing apparatus 1 and the wearable device 2 more easily than before. In addition, as described above, since the image data is transferred to the wearable device 2 using the established communication other than the BAN communication, the user who wears the wearable device 2 does not need to keep touching on the image processing apparatus 1 until the transfer of the image data finishes. It should be noted that the configuration described above is not essential, and other connecting configurations such as connecting the wearable device 2 to the image processing apparatus 1 using USB interface and performing communication can be adopted.

In addition, in this embodiment, the operation after scanning is configured via the configuration screen generated based on the device capability information that includes the executable process information, it is transferred to the wearable device 2 as the job information, and the wearable device 2 performs processing on the scanned image transferred from image processing apparatus 1 in accordance with the transferred operation after scanning. Consequently, since it is not necessary to configure operations performed on the received scanned image on the wearable device 2, it is possible to configure the operation after scanning more easily than before. It should be noted that the configuration described above is not essential, and the operation after scanning can be preset on the wearable device 2. In this case, it is unnecessary to include the executable process information in the device connection information.

In addition, in this embodiment, the case that the operation after scanning is transferred to the wearable device 2 as the job information along with the job ID using the BAN communication is described as an example. It is also possible to transfer the operation after scanning to the wearable device 2 apart from the job ID using the network communication established between the image processing apparatus 1 and the wearable device 2. In this case, it is possible to reduce information to be transferred using the BAN communication, and it is possible to reduce a period of time that the user who wears the wearable device 2 touches the image processing apparatus 1.

In the embodiment described above, the case that the configuration screen generator 132 generates the configuration screen that also displays items that are not selectable is described as an example. Otherwise, it is possible to generate the configuration screen that does not display the items that are not selectable.

In the embodiment described above, the case that the image processing apparatus 1 reports the processing status and transfers the scanned image in accordance with the request from the wearable device 2. Otherwise, it is also possible that the image processing apparatus 1 reports the processing status to the wearable device 2 regularly without the request from the wearable device 2 or the image processing apparatus 1 transfers the scanned image to the wearable device 2 after finishing scanning.

In the embodiment described above, the case that the wearable device 2 transfers the device capability information that includes display types, supported image formats, and executable operations to the image processing apparatus 1 using the BAN communication. Otherwise, it is also possible that the wearable device 2 transfers the device identification information that includes a vendor ID to identify the vendor of the wearable device 2 and a product ID of the wearable device 2 to the image processing apparatus 1 using the BAN communication. Embodiments described above are described below.

Figures 12, 13:
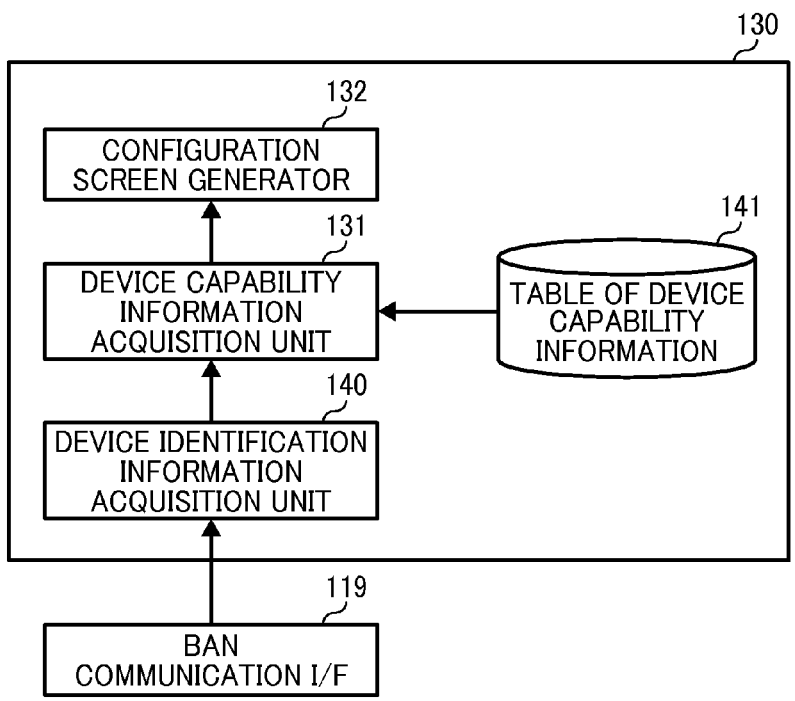
FIG. 12 is a block diagram illustrating a functional configuration of the main controller in the image processing apparatus as an embodiment of the present invention.
FIG. 13 is a diagram illustrating a table of the device capability information stored in a device capability information table storing unit as an embodiment of the present invention.

FIG. 12 is a block diagram illustrating a part of a functional configuration of the main controller 130 in case the wearable device 2 transfers the device identification information that includes the vendor ID and the product ID of the wearable device 2 to the image processing apparatus 1. As shown in FIG. 12, the main controller 130 includes a device identification information acquisition unit 140 and a device capability information table storage unit 141 in addition to the functional configuration in FIG. 6. In FIG. 12, the configuration same as the configuration in FIG. 6 is omitted. Only the configuration that is different from the configuration in FIG. 6 is described below.

If the BAN communication is established, the device identification information acquisition unit 140 acquires the vendor ID and the product ID transferred from the wearable device 2 via the BAN communication I/F 119 as the device identification information and outputs it to the device capability information acquisition unit 131. The device capability information acquisition unit 131 acquires the device capability information based on the device identification information input from the device identification information acquisition unit 140 and the device capability information table stored in the device capability information table storage unit 141 and outputs it to the configuration screen generator 132 (described in detail later with reference to FIG. 14).

FIG. 13 is a diagram illustrating the device capability information table stored in the device capability information table storage unit 141. The device capability information table storage unit 141 is a storage device that stores the device capability information table preset by the administrator etc. As shown in FIG. 13, in the device capability information table, a combination of the vendor ID and the product ID is associated with the device capability information that includes display types, supported image formats, and executable operations. For example, as shown in FIG. 13, in the device capability information table, a combination of the vendor ID "0x0101" and the product ID "0x0001" is associated with the device capability information that includes the display type "monochrome", the supported image format "JPEG", and the executable operation "display". It is possible to update the device capability information table stored in the device capability information table storage unit 141 externally using software update etc. appropriately.

Figure 14:
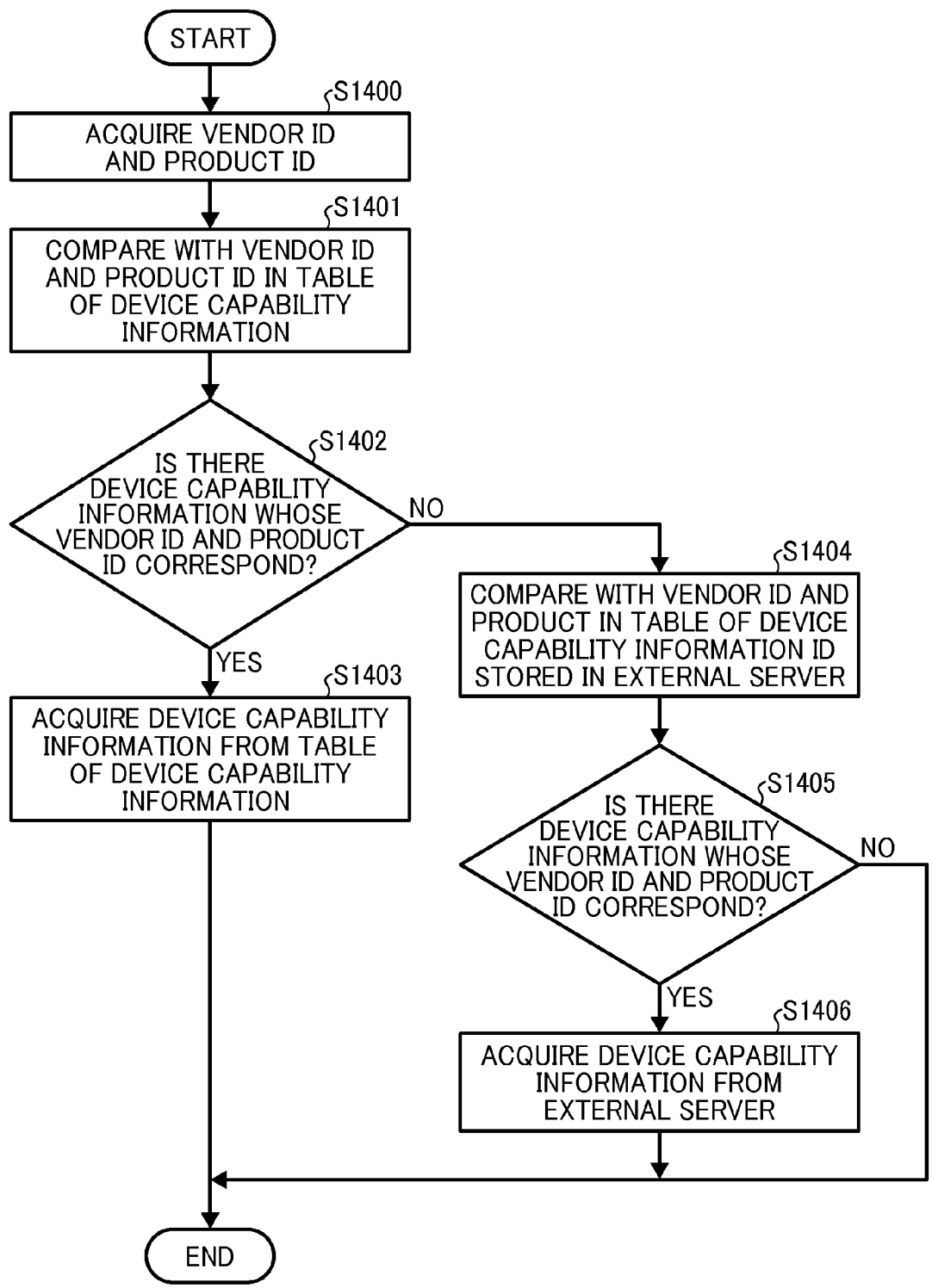
FIG. 14 is a flowchart illustrating a process that a device capability information acquisition unit acquires the device capability information as an embodiment of the present invention.

FIG. 14 is a flowchart illustrating a process that the device capability information acquisition unit 131 acquires the device capability information. As shown in FIG. 14, the device capability information acquisition unit 131 acquires the vendor ID and the product ID included in the device identification information input from the device identification information acquisition unit 140 in S1400.

After acquiring the vendor ID and the product ID, the device capability information acquisition unit 131 compares each of the combinations of the vendor ID and the product ID in the device capability information table stored in the device capability information table storage unit 141 with the acquired vendor ID and the product ID in S1401.

If there is device capability information whose vendor ID and product ID corresponds in the device capability information table stored in the device capability information table storage unit 141 (YES in S1402), the device capability information acquisition unit 131 acquires the device capability information whose vendor ID and product ID corresponds from the device capability information table stored in the device capability information table storage unit 141 in S1403.

For example, if the vendor ID is "0x0101" and the product ID is "0x0002" included in the device identification information input from the device identification information acquisition unit 140, the device capability information acquisition unit 131 acquires the device capability information that includes the display type "monochrome", the supported image format "JPEG" and "PDF", and the executable operation "display" and "save" from the device capability information table in FIG. 13 stored in the device capability information table storage unit 141.

By contrast, in S1404, if there is not device capability information whose vendor ID and product ID corresponds in the device capability information table stored in the device capability information table storage unit 141 (NO in S1402), the device capability information acquisition unit 131 compares the vendor ID and the product ID in the device capability information table stored in an external server (not shown in figures) with the vendor ID and product ID acquired in S1400.

If there is device capability information whose vendor ID and product ID corresponds in the device capability information table stored in the external server (YES in S1405), the device capability information acquisition unit 131 acquires the device capability information whose vendor ID and product ID corresponds from the device capability information table stored in the external server in S1406. By contrast, if there is not device capability information whose vendor ID and product ID corresponds in the device capability information table stored in the external server (NO in S1405), the device capability information acquisition unit 131 does not acquires the device capability information, and the process ends.

The configuration screen generator 132 generates the configuration screen displayed on the display panel 113 on the image processing apparatus 1 based on the device capability information input from the device capability information acquisition unit 131 just like the case described above with reference to FIG. 6. If the device capability information acquisition unit 131 cannot acquire the device capability information, the device capability information acquisition unit 131 reports to the configuration screen generator 132 about that, and the configuration screen generator 132 generates the configuration screen preset as default.

By adopting the configuration described above, since the image processing apparatus 1 controls the device capability information, the image processing apparatus 1 can manage the device capability information flexibly such as editing information included in the device capability information, and it is possible to generate the configuration screen by acquiring information that identifies the device only from the wearable device 2.

In the embodiment described above, the case that the vendor ID and the product ID is regarded as the device identification information is described. However, this is just an example, whatever information that can identify each of the wearable devices 2 uniquely such as one ID that consists of the vendor ID and the product ID and a uniquely identifiable device ID etc. It is possible that the device identification information does not identify each of the wearable devices 2 uniquely but can identify predetermined device groups such as in units of model of the wearable device.

In the embodiment described above, if there is not device capability information whose vendor ID and product ID corresponds in the device capability information table stored in the device capability information table storage unit 141, the device capability information acquisition unit 131 refers to the device capability information table stored in the external server. However, it is unnecessary to use the external server. If the external server does not exist, the device capability information acquisition unit 131 does not acquire the device capability information, and the process ends. Otherwise, it is possible to set up multiple external servers.

In the embodiment described above, if there is not device capability information whose vendor ID and product ID corresponds in the device capability information table stored in the device capability information table storage unit 141 or the external server, the device capability information acquisition unit 131 does not acquires the device capability information, and the process ends. Subsequently, the configuration screen generator 132 generates the configuration screen preset as default. Otherwise, it is possible that the device capability information acquisition unit 131 outputs the device capability information preset as default to the configuration screen generator 132 and the configuration screen generator 132 generates the configuration screen based on the device capability information preset as default input from the device capability information acquisition unit 131.

In the embodiment described above, the image distribution system that distributes the scanned image that the image processing apparatus 1 generates to the wearable device 2 is described as an example. Otherwise, the embodiment can be applied to a print system that the image processing apparatus 1 processes image data stored in the wearable device 2. In this case, for example, it is assumed that the image processing apparatus 1 prints out image data captured by the wearable device 2 that includes a camera as an image pickup mechanism. In this case, the device capability information includes color mode that the camera included in the wearable device 2 can capture (e.g., "monochrome").

Based on the device capability information received from the wearable device 2, the image processing apparatus 1 displays the configuration screen for printing. For example, if the color mode included in the device capability information is "monochrome", the image processing apparatus 1 displays the configuration screen that can select "monochrome" as the color mode for printing and cannot select the color mode "color". After starting printing, the status of the printing process is displayed on the LCD 60 in the wearable device 2. After finishing printing, the message that indicates the end of printing is displayed on the LCD 60 in the wearable device 2. In this case, unlike performing scanning, no data is transferred to the wearable device 2 as a processing result. Therefore, the configuration for the data transmitter 139 in FIG. 6, the data acquisition unit 236, the data storage processor 237, and the data storage unit 238 in FIG. 9 is omitted.

The present invention also encompasses a control method performed by an image distribution system that includes an image processing apparatus that scans a document and generate a scanned image and a wearable device that receives the scanned image distributed by the image processing apparatus. The method includes the steps of scanning an image into a scanned image, acquiring device capability information that includes display capability information indicating an image display capability of a wearable device that receives the scanned image, and controlling whether or not a setting is selectable on a configuration screen displayed on a display unit of the image processing apparatus, the setting being used to generate configuration information for scanning the image.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image distribution system, comprising:
an image processing apparatus including a first processor configured to generate a scanned image by scanning an image; and
a wearable device including a second processor configured to receive the scanned image distributed by the image processing apparatus,
the first processor of the image processing apparatus being further configured to,
acquire device capability information that includes display capability information indicating an image display capability of the wearable device,
display a configuration screen, the displayed configuration screen displaying at least one setting from among one or more settings for controlling a manner in which the scanned image is generated by the image processing apparatus, and
control at least a first setting, from among the one or more settings, such that,
when the device capability information indicates that the wearable device does not have a first capability, the first setting is not selectable through the displayed configuration screen, and
when the device capability information indicates that the wearable device has the first capability, the first setting is selectable through the displayed configuration screen.

2. The image distribution system according to claim 1, wherein the first processor is further configured to acquires the device capability information by body area network (BAN) communication with the wearable device.

3. The image distribution system according to claim 1, wherein the first processor is further configured to acquire device identification information for identifying the wearable device, and
wherein the first processor is further configured to acquires the device capability information of the wearable device identified by the acquired device identification information from among multiple sets of device capability information of multiple wearable devices stored in a storage device.

4. The image distribution system according to claim 1, wherein the second processor of the wearable device is further configured to
acquire the scanned image generated based on the configuration information generated via the configuration screen displayed on the display unit of the image processing apparatus; and
process the acquired scanned image.

5. The image distribution system according to claim 4, wherein the second processor of the wearable device is further to,
acquire device connection information for communicating with the image processing apparatus using a communication method other than BAN communication by communicating with the image processing apparatus using BAN communication, and
acquire the scanned image by communicating with the image processing apparatus using the communication method other than BAN communication based on the acquired device connection information.

6. The image distribution system according to claim 4, wherein the device capability information includes executable process information indicating a process performable on the scanned image in the wearable device, and the first processor is configured to control whether or not the setting for the process performed on the scanned image is selectable in the configuration screen based on the executable process information included in the device capability information,
wherein the second processor is configured to acquire process information indicating the process performed on the scanned image selected via the configuration screen, and process the scanned image in accordance with the acquired process information.

7. The image distribution system according to claim 6, wherein the second processor is configured to acquire the process information indicating a displaying process that displays the scanned image on a display unit of the wearable device, and display the scanned image on the display unit of the wearable device in accordance with the acquired process information.

8. An image processing apparatus comprising:
a memory storing computer-readable instructions; and
a processor configured to execute the instructions to
generate a scanned image by scanning an image;
acquire device capability information that includes display information indicating image display capability of a wearable device that receives the scanned image distributed by the image processing apparatus,
display a configuration screen, the displayed configuration screen displaying at least one setting from among one or more settings for controlling a manner in which the scanned image is generated by the image processing apparatus, and
control at least a first setting, from among the one or more settings, such that,
when the device capability information indicates that the wearable device does not have a first capability, the first setting is not selectable through the displayed configuration screen, and
when the device capability information indicates that the wearable device has the first capability, the first setting is selectable through the displayed configuration screen.

9. The image processing apparatus according to claim 8, wherein the first processor is configured to device capability information acquire the device capability information by body area network (BAN) communication with the wearable device.

10. The image processing apparatus according to claim 8, wherein the first processor is configured to acquire device identification information for identifying the wearable device, such that the first processor acquires the device capability information of the wearable device identified by the acquired device identification information from among multiple sets of device capability information of multiple wearable devices stored in a storage device.

11. A non-transitory, computer-readable recording medium storing a program that, when executed by a processor, causes the processor to implement a method of controlling information to be displayed at an image processing apparatus,
the method comprising the steps of:
generating a scanned image by scanning an image;
acquiring device capability information that includes display capability information indicating an image display capability of a wearable device that receives the scanned image;
displaying a configuration screen, the displayed configuration screen displaying at least one setting from among one or more settings for controlling a manner in which the scanned image is generated by the image processing apparatus; and
controlling at least a first setting, from among the one or more settings, such that,
when the device capability information indicates that the wearable device does not have a first capability, the first setting is not selectable through the displayed configuration screen, and
when the device capability information indicates that the wearable device has the first capability, the first setting is selectable through the displayed configuration screen.

* * * * *